United States Patent Office 2,891,038
Patented June 16, 1959

2,891,038

POLYMERIZATION PROCEDURES

Carl E. Barnes, Chepachet, R.I., William O. Ney, Jr., Ponca City, Okla., and William R. Nummy, Midland, Mich., assignors, by mesne assignments, to General Aniline & Film Corporation, New York, N.Y., a corporation of Delaware No Drawing. Application September 1, 1953
Serial No. 377,960

3 Claims. (Cl. 260—78)

The present invention relates to the polymerization of pyrrolidone.

United States Patent No. 2,638,463, issued to Ney et al., describes the polymerization of pyrrolidone. In our copending U.S. application, Serial No. 338,552, further procedures for polymerizing pyrrolidone are described.

The principal object of the present invention is to provide further novel improvements in the polymerization of pyrrolidone.

A further object of the invention is to provide new procedures for making polypyrrolidone in good yield and in a commercially attractive manner.

Still further objects and the entire scope of applicability of the present invention will become apparent from the detailed description given hereinafter; it should be understood, however, that this detailed description and specific examples, while indicating preferred embodiments of the invention, are given by way of illustration only, since various changes and modifications within the spirit and scope of the invention will become apparent to those skilled in the art from this detailed description.

The foregoing objects are accomplished, according to the present invention, by a process involving the steps of heating a mixture of the pyrrolidone and polymerization catalyst to remove water therefrom, thereafter cooling the mixture from which water has been removed and allowing polymerization of the cooled reaction mixture to continue.

The success of the invention is due, at least to a large extent, to the discovery that pyrrolidone polymerizes to give extremely good yields of polypyrrolidone if the reaction mixture, after removal of the water therein, is permitted to stand for a period of time, for example, from a few hours to about 14 days, at relatively low temperatures, such as from about 25° to 65° C. In other words, it has been discovered that, in contrast to the conventional polymerization procedures, high temperatures are not essential to polymerization of pyrrolidone and, in fact, tend to minimize the amount of polymer formed.

We have discovered that the polymerization characteristics of commercially available pyrrolidone (monomer) from different sources of supply, and even from the same source, continually vary, evidently due to different methods of manufacture and the presence of impurities. Accordingly, for the purpose of obtaining uniform yields, we have found it desirable to subject the pyrrolidone to some preliminary purification treatment such as fractional distillation under reduced pressure, although such purification is not in all cases essential. The purified pyrrolidone may then be used in the process of this invention which, up to and including the removal of water from the reaction mixture, substantially corresponds with the process described in our abovementioned U.S. Patent No. 2,638,463. Thus, the catalyst, e.g., potassium hydroxide pellets, may be added to the pyrrolidone in an amount varying from about 0.5 to 2.5 parts catalyst per 100 parts pyrrolidone and the water formed removed from the reaction mixture by distillation at a temperature of between 90 and 120° C. and at reduced pressure of the order of 0.5 to 10 mm. As will be appreciated, any catalyst for polymerizing pyrrolidone, for example, those referred to in our U.S. Patent No. 2,638,463, may be utilized in the process of the invention. Likewise, if desired, an acyl compound may be utilized for activating, i.e., increasing the rate of, polymerization, as described in Serial No. 338,552. Furthermore, it appears that the activator serves to overcome the undesired effects of polymerization inhibitors, such as water, which may have found their way into the reaction mixture.

After removal of water from the reaction mixture, the latter may be cooled and polymerized, in any convenient manner, e.g., by permitting the same to stand at room temperature (about 25° to 30° C.) or by immersion in a water bath maintained at the desired temperature. The temperature to which the reaction mixture, freed from water, is cooled and permitted to stand can be rather widely varied with satisfactory results, but should be maintained within the range of about 25° to 65° C., as noted above, with 40° to 55° C. being preferred. Polymerization begins almost instantaneously with the cooling of the reaction mixture to within the temperature range stated, as evidenced by the formation of a white powder or cake in the reaction mixture.

The duration of the polymerization reaction, i.e., the length of time which the cooled reaction mixture is permitted to stand, can be varied. Generally, however, polymerization is substantially completed, i.e., yields as great as 70% or better are obtained, in from a few hours to about 14 days. During the polymerization reaction precautions should be taken to insure against the admission of air or moisture or compounds having readily available hydrogen to the reaction mixture since these materials will inhibit the polymerization.

The invention is further illustrated, but not limited, by the following examples, where parts referred to are by weight.

*Example I*

In a vessel equipped for vacuum distillation and mechanical stirring, there is placed 200 parts of commercial (unpurified) pyrrolidone, to which is added one part of potassium hydroxide pellets. The water formed is removed by distilling off 20 parts of reaction mixture at a temperature between 90° and 120° C. and a pressure between 0.5 and 10 mm. The reaction mixture remaining in the still pot is cooled and allowed to stand for five days at room temperature (25° C.) in a vessel sealed to exclude atmospheric moisture. The polymer is isolated by the addition of 500 parts of distilled water, filtered off and washed thoroughly to remove water-soluble impurities. The yield of polymer amounts to 5 parts, or 2.5%, and the polymer can be spun and drawn into highly satisfactory fibers or filaments.

*Example II*

In a vessel equipped for vacuum distillation and mechanical stirring, there is placed 400 parts of commercial pyrrolidone, purified as described above by fractional distillation, to which 4 parts of potassium hydroxide pellets are added. The water formed is removed by distilling off 12% of the reaction mixture at a temperature between 90° and 120° C. and a pressure between 0.5 and 10 mm. The reaction mixture remaining in the still pot is cooled and allowed to stand for seven days at room temperature (28° C.) in a vessel sealed under vacuum to exclude atmospheric moisture. The polymer is isolated in the manner of Example I to give a yield of 43% and produces satisfactory fibers.

Example III

The procedure of Example II is repeated, except that the reaction mixture is permitted to stand at 45° C. for seven days. A 65% to 70% yield of polymer having a relative viscosity (1% solution in meta-cresol) of 10.02 is obtained.

Example IV

The procedure of Example II is repeated, except that the reaction mixture is permitted to stand at 55° C. for seven days. A 65% yield of polymer is obtained.

Example V

The procedure of Example II is repeated, except that the reaction mixture is permitted to stand at 65° C. for seven days. A 44% yield of polymer having a relative viscosity (1% solution in meta-cresol) of 6.95 is obtained.

Example VI

In a vessel equipped for vacuum distillation and mechanical stirring, there is placed 400 parts of unpurified pyrrolidone and 6 parts of potassium hydroxide pellets. After 24% of the reaction mixture is distilled off, the reaction mixture is cooled to room temperature and allowed to stand for fourteen days in a vessel sealed to exclude atmospheric moisture. The resulting polymer is isolated in the manner of Example I as a 10% yield and gives highly desirable fibers.

Example VII

In a vessel equipped for vacuum distillation and mechanical stirring, there is placed 400 parts of commercial pyrrolidone, purified as described above, to which 8 parts of potassium hydroxide pellets is added. The water formed is removed by distilling off 14% of the reaction mixture at a temperature between 90° and 120° C. and a pressure between 0.5 and 20 mm. The reaction mixture remaining in the still pot is cooled and allowed to stand for two days at room temperature in a vessel sealed under vacuum to exclude atmospheric moisture. The polymer is isolated in the manner of Example I to give a yield of 12% and can be spun and drawn into satisfactory fibers.

Example VIII

The process of Example II is repeated except that the reaction mixture is permitted to stand at 40° C. for two days. A 29% yield of polymer results.

Example IX

The process of Example II is repeated except that the reaction mixture is permitted to stand at 40° C. for five days. A 52% yield of polymer results.

Example X

The process of Example II is repeated except that the reaction mixture is permitted to stand at 40° C. for seven days. A 70% yield of polymer results.

Example XI

The process of Example II is repeated except that the reaction mixture is permitted to stand at 60° C. for two days. A 29% yield of polymer results.

Example XII

The process of Example II is repeated except that the reaction mixture is permitted to stand at 60° C. for five days. A 52% yield of polymer results.

Example XIII

The process of Example II is repeated except that the reaction mixture is permitted to stand at 75° C. for two days. A 3% yield of polymer having a relative viscosity (1% meta-cresol solution) of 2.01 results.

Example XIV

In a vacuum vessel is placed 200 parts of pyrrolidone, identical with that used in Example I, and 1 part of potassium hydroxide pellets. The water formed is removed by distilling off 20 parts of the mixture at temperatures between 90° and 120° C., and pressures between 0.5 and 10 mm. The reaction mixture remaining in the still pot is treated with 20 parts of gamma-butyrolactone, and the resulting mixture is allowed to stand at room temperature for two hours. By this time, the mixture has completely solidified and is treated with 500 parts of water, and the mixture thoroughly agitated to break up the relatively hard solid. The polymer is isolated as a nearly white powder by filtration and washed thoroughly with distilled water. 91 parts of polymer or a yield of 45.5% is obtained.

Example XV

In a vessel equipped for vacuum distillation and mechanical stirring are placed 200 parts of pyrrolidone identical with that used in Example I above, 20 parts of gamma-butyrolactone and 1 part potassium hydroxide pellets. 20 parts of this material is removed by distillation at a temperature between 90° and 120° C., at pressures of 0.5 to 10 mm. The reaction mixture remaining in the still pot is cooled and allowed to stand at room temperature. After standing three hours, the material is quite firm and solid. 500 parts of distilled water is then added and the mixture agitated thoroughly. The polymer obtained after filtration and thorough washing with distilled water amounts to 82 parts or 41% by weight.

Example XVI

In a vacuum vessel is placed 200 parts of pyrrolidone, identical with that used in Example VII, and one part of potassium hydroxide pellets. The water formed is removed by distilling off 20 parts of the mixture at temperatures between 90° and 120° C., and pressures between 0.5 to 10 mm. The reaction mixture remaining in the still pot is treated with 9 parts of gamma-butyrolactone, and the resulting mixture allowed to stand at room temperature for 24 hours. The polymerization proceeds to such an extent that the resulting solid is extremely hard and cannot be worked up by the addition of water, nor can it be readily shredded or cut. It is a very hard, tough, buff colored solid which has taken the shape of the container in which it stood. The polymerization is essentially complete within 24 hours.

Example XVII

In a vacuum vessel is placed 200 parts pyrrolidone, purified by fractional distillation, as heretofore described, and one part potassium hydroxide pellets. The water formed is removed by distilling off 20 parts of the mixture at temperatures between 90° and 120° C., and pressures of between 0.5 to 10 mm. Two parts of gamma-valerolactone is added and the resulting mixture is allowed to stand for three days at room temperature. 500 parts of distilled water is added and the insoluble polymer filtered off and washed with distilled water. 41 parts or 20.5% of polymer is obtained.

Example XVIII

In a vessel equipped for vacuum distillation and stirring, add 15 parts of potassium hydroxide pellets while stirring to 1500 parts of pyrrolidone, seal the system and immediately distil off ca. 400 parts of pyrrolidone under vacuum as rapidly as possible (20 to 30 minutes). Pot temperatures should be less than 130° C.; for best results; vapor temperatures will run 120° to 125° C. Pressure will vary from about 10 mm. of mercury during the surge of released water in the early stages to less than 1 mm. at the end of distillation. This amount of distillate is desirable since it insures removal of nearly all the water present. The reaction mixture is then cooled to about 40° C., and 3.75 parts of adipyl dipyrrolidone, dissolved in 100 parts of anhydrous pyrrolidone, is stirred in. A mildly exothermic reaction sets in after a few minutes after addition of the activator and shortly afterwards the batch sets up to a tough, gel-like mass which will stop a laboratory stirrer.

After 24 hours' standing, the tough gel is broken up and thoroughly agitated in a Waring Blendor with about 5 volumes of water to remove the remaining caustic and any other water-soluble materials. The polymer is filtered and rewashed with about the same amount of water, filtered again, sucked dry at the pump and then dried in a circulating air oven at 65° to 70° C.

The yield after drying to less than 1% moisture is 468 parts of granular polymer or 39% conversion based on the 1200 parts of pyrrolidone in the polymerizing mixture. This polymer has a relative viscosity of 4.0 for a 1% solution in meta-cresol.

*Example XIX*

In a manner similar to that of the preceding example, pyrrolidone is polymerized, using in place of the 3.75 parts adipyl dipyrrolidone, about 30 parts of maleic anhydride as activator. There is obtained a 61% theoretical yield of polymer having a relative viscosity of 2.4 for a 1% solution in meta-cresol.

*Example XX*

The procedure of Example XVI is repeated, using 18 parts of butyl stearate as activator and 8 parts potassium hydroxide pellets as catalyst. After standing overnight, a very hard resinous mass is obtained. This mass is dissolved by warming in anhydrous formic acid and then reprecipitated by diluting with 10 volumes of water. A 64% theoretical yield of product having a relative viscosity of a 1% solution in meta-cresol of 1.6 is obtained.

*Example XXI*

100 parts of catalyzed pyrrolidone, as used in Example XVII is activated by the addition of 2 parts dimethyl malonate. A mildly exothermic reaction begins immediately. After standing for 48 hours, the reaction mixture sets up and is worked up as described in Example XX. There are obtained 56 parts of polypyrrolidone.

*Example XXII*

100 parts of catalyzed pyrrolidone, as used in Example XVII, are activated by the addition of 2.2 parts benzoyl chloride. An exothermic reaction begins and, in less than 1 minute, a firm solid mass is obtained. After 48 hours, the mass is worked up in the manner of Example XX with formic acid. Yield of 74% polypyrrolidone having a relative viscosity of a 1% solution in meta-cresol of 6.7 is obtained.

*Example XXIII*

The process of Example II is repeated except that 0.4 parts acetic anhydride is added to the reaction mixture after cooling following the distillation to remove water. A yield in excess of 70% is obtained after seven days at room temperature.

*Example XXIV*

The procedure of Example V is repeated except that 0.4 part acetic anhydride is added to the reaction mixture after cooling following the distillation to remove water. A yield in excess of 70% is obtained after seven days at 65° C. The polymer has a relative viscosity (1% solution in meta-cresol) of 7.35.

From the foregoing examples, it will be seen that the yield of polymer varies dependent upon whether or not the pyrrolidone is initially purified. As previously indicated, best results are obtained using fractionally distilled, or otherwise purified, pyrrolidone but, as shown in the examples, satisfactory results are also obtained using commercial (unpurified) pyrrolidone. Likewise, it will be seen that the presence or absence of an activator causes a variance in the yield of polymer and/or rate of polymerization but both modifications, i.e., use and non-use of activators, are advantageous. Quite unexpectedly, it has been found that, when the polymerization temperature is reduced from 160° C. or even from 75° C., as shown in the examples of our aforesaid patent, and the polymerization time correspondingly extended to compensate for the reduction in temperature, the yields of polymer obtained instead of being substantially equivalent, as was to be anticipated, are remarkably increased, as illustrated by the ensuing examples, notably, Examples X, XII and XIII.

In connection with the illustrative embodiments and examples herein set forth, the following represents a desirable general procedure:

(1) The pyrrolidone, from any source, is preferably purified by fractional distillation under reduced pressure, e.g., 20 mm.;

(2) The distillate so obtained from (1) is introduced into a suitable vessel, in which there is maintained an atmosphere of dry nitrogen to keep out atmospheric air and moisture, and admixed with a suitable catalyst, such as potassium hydroxide. Assuming there are 100 g. of monomer, from 0.5 to 2.5% catalyst may be added with stirring, preferably about 1%, i.e., 1 g.;

(3) The vessel containing the reaction mixture of catalyst and pyrrolidone is then evacuated as completely as possible and heated at a temperature of the order of about 90° to 120° C. under a reduced pressure of from about 0.5 to 10 mm. with stirring, to remove from about 10% to 15% or more of the reaction mixture as desired, thereby rendering the reaction mixture substantially free of water;

(4) Thereafter distillation is discontinued while the reaction mixture is either kept under reduced pressure, e.g., by means of a quick acting stopcock or valve which isolates the reaction mixture from the water which has been distilled off, or the vacuum on the system is broken by bleeding in an inert gas, e.g., dry nitrogen.

(5) The reaction mixture is then cooled to about 25° to 65° C. in any suitable manner, as by a water or ice bath. In the case where dry nitrogen is bled into the system to break the vacuum the cooling is preferably initiated immediately prior to introduction of the nitrogen. On the other hand, where the vacuum is retained by shutting off a stopcock or valve, the initiation of cooling preferably immediately follows this operation.

(6) Where the vacuum is broken by introducing nitrogen into the system, the water-containing distillate is removed from the apparatus as by removing the vessel containing such distillate, and the vessel containing the reaction mixture is sealed either under vacuum or under an atmosphere of nitrogen so as to keep the reaction mixture dry and free from atmospheric air and moisture; where the vacuum is maintained by shutting off a valve or stopcock, this step of further evacuation or use of a nitrogen atmosphere is unnecessary, and it is only necessary to assure that the vacuum conditions prevailing at the time the stopcock or valve is closed are maintained; however, if desired, dry nitrogen may be bled into the evacuated vessel as an added safeguard and the vessel sealed;

(7) Thereafter the sealed reaction vessel is allowed to stand at about 25° to 65° C. for about two to fourteen days, preferably about seven days, to allow polymerization to continue at the reduced temperature as in the aforesaid examples;

(8) Where an activator is utilized, this can be introduced at any point either before or after distillation to remove water. Thus, the activator can be introduced either along with the catalyst as in step (2) or following discontinuation of step (3) and either before or after cooling has been initiated. However, the introduction of the activator in all cases must take place before the flask and contents are sealed.

As will be appreciated, various modifications can be made in the invention as described above. For example, polymerization may be carried out in the presence of solvents, such as dioxane, pyridine, and the like. Additionally, the polymerization reaction may be carried out at superatmospheric pressure or under the pressure of an inert gas, such as nitrogen, although it is preferred to utilize atmospheric or reduced pressures. Accordingly, it will be understood that the invention is not limited to the foregoing description, except as it is defined in the appended claims.

This application is a continuation-in-part of our above-mentioned copending application, Serial No. 338,552, filed February 24, 1953, and the disclosure thereof is hereby incorporated into this specification and claims of this application.

We claim:

1. Process for polymerizing pyrrolidone which comprises forming a reaction mixture consisting essentially of pyrrolidone and an alkaline polymerization catalyst, distilling said reaction mixture at 90 to 120° C. under reduced pressure at least until said reaction mixture is substantially freed of water, without substantial polymerization of said pyrrolidone, directly following said distilling discontinuing said distillation and immediately thereafter cooling the undistilled portion to a temperature of 25 to 65° C. by the application of a cooling medium, and allowing said reaction mixture to polymerize, while maintaining the temperature thereof from 25 to 65° C., for from a few hours to fourteen days, said distillation, cooling and polymerization being effected while the reaction mixture is substantially out of contact with the atmospheric air and moisture.

2. Process for polymerizing pyrrolidone which comprises forming a reaction mixture consisting essentially of pyrrolidone, purified by distillation, and an alkaline polymerization catalyst, distilling said reaction mixture at 90 to 120° C. under reduced pressure at least until said reaction mixture is substantially freed of water, without substantial polymerization of said pyrrolidone, directly following said distilling discontinuing said distillation and immediately thereafter cooling the undistilled portion to a temperature of 25 to 65° C. by the application of a cooling medium, and allowing said reaction mixture to polymerize, while maintaining the temperature thereof from 25 to 65° C., for from a few hours to fourteen days, said distillation, cooling and polymerization being effected while the reaction mixture is substantially out of contact with the atmospheric air and moisture.

3. The process of claim 1, wherein the reaction mixture is cooled to a temperature within the range of from 40° to 55° C.

References Cited in the file of this patent

UNITED STATES PATENTS

| | | |
|---|---|---|
| 2,638,463 | Ney et al. | May 12, 1953 |
| 2,739,959 | Ney et al. | Mar. 27, 1956 |
| 2,809,958 | Barnes et al. | Oct. 15, 1957 |